(12) United States Patent
Zander

(10) Patent No.: US 6,275,658 B1
(45) Date of Patent: Aug. 14, 2001

(54) MULTI-ZONE AUTOFOCUS SYSTEM FOR A STILL CAMERA

(75) Inventor: Dennis R. Zander, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/410,766

(22) Filed: Oct. 1, 1999

(51) Int. Cl.[7] ................................................ G03B 13/00
(52) U.S. Cl. ........................ 396/123; 396/103; 396/106
(58) Field of Search .............................. 396/89, 103, 106, 396/107, 111, 116, 117, 120, 123, 125, 126, 127

(56) References Cited

U.S. PATENT DOCUMENTS

| | | |
|---|---|---|
| 3,375,460 | 3/1968 | Miller . |
| 4,238,153 | * 12/1980 | Imura ................................ 354/25 |
| 4,300,824 | 11/1981 | Tokuda et al. . |
| 4,518,253 | 5/1985 | Takahashi . |
| 4,615,599 | 10/1986 | Kataoka et al. . |
| 5,138,358 | 8/1992 | Aoyama et al. . |

FOREIGN PATENT DOCUMENTS

61203429A * 9/1996 (JP) ................................ G03B/3/00

* cited by examiner

Primary Examiner—Russell Adams
Assistant Examiner—Arthur A. Smith
(74) Attorney, Agent, or Firm—Francis H. Boos, Jr.

(57) ABSTRACT

A multi-zone autofocus system for a still camera having at least three autofocus distance zone focus settings in which a two-zone autoranging circuit is operated sequentially at different threshold settings corresponding to different distances from the camera under control of a microprocessor to enable discrimination among at least three focus zone settings.

7 Claims, 2 Drawing Sheets

MULTI-ZONE AUTOFOCUS SYSTEM FOR A STILL CAMERA

FIELD OF THE INVENTION

The invention relates generally to the field of autofocus systems for still cameras and more specifically to a low cost system utilizing a limited zone autoranging device to establish an object focus distance setting in an expanded number of focus zones.

BACKGROUND OF THE INVENTION

It is common in more expensive still cameras to employ an autofocus system which utilizes an autoranging system to determine the distance of an object in a scene to be captured and to actuate lens focusing apparatus to move the lens to an exact focus position that corresponds to the determined distance. In less expensive cameras, the autofocus apparatus is adapted to move the lens to one of a limited number of focus positions that corresponds to selected distance zones away from the camera. For example, a two zone focus camera employs an autofocus apparatus coupled with a two zone autoranging device that will set the taking lens focus position at either a "far" or "near" position depending on whether the ranging device finds the principal object in the scene to be beyond or closer than a predefined intermediate distance, typically 6 feet, that separates the two zones. By setting the focus at a suitable distance point within the zone indicated by the ranging device, appropriate shutter aperture and speed settings then establish an adequate depth-of-field to assure acceptable focus throughout most of the zone involved.

While two zone cameras are commonly accepted, there are occasions when it is desirable to distinguish between a "near" distance zone typically used for group shots and a closer distance zone, such as 2–3 feet, typically used for closeup shots of individuals. In this case, the camera conventionally employs a three zone autofocus apparatus coupled with a three zone autoranging device, the latter outputting a "far", "near" or "closeup" indication to the autofocus apparatus to set the appropriate taking lens focus position. The use of a three zone autoranging device requires a more expensive integrated circuit and light source to implement as compared to a two zone device. Consequently, there is a need in low cost cameras for a less costly arrangement and, more specifically, to employ a two zone autoranging device in a manner that enables setting a three zone autofocus apparatus to an appropriate distance setting that includes a "closeup" setting as well as "far" and "near".

SUMMARY OF THE INVENTION

In accordance with the invention, therefore, there is provided a multi-zone autofocus system for a still camera that comprises a distance threshold setting circuit sequentially changeable to set first and second threshold values corresponding to a first distance from the camera and to a second, closer, distance from the camera; a two zone autoranging circuit connected to said threshold setting circuit and operable to locate an object in one of two distance zones separated by a distance determined by a value of said threshold setting circuit; and autofocus apparatus responsive to said autoranging circuit for setting a camera focus to one of at least two distance zones determined by said autoranging circuit. The system further includes a camera controller programmed to activate said autoranging circuit to perform a first autoranging operation with said distance threshold setting circuit set to said first threshold value to determine if said object is located in a zone nearer or farther than said first distance amount and, if farther, to activate said autofocus apparatus to set camera focus for a first distance zone farther than said first distance and, if nearer, to activate said autoranging circuit to perform a second autoranging operation with said distance threshold setting circuit set to said second threshold value to determine if said object is located in a zone nearer or farther than said second distance and, if farther, to activate said autofocus apparatus to set camera focus for a second distance zone between said first and second distances and, if nearer, to set said autofocus apparatus for a third distance zone closer than said second distance.

In a preferred form of the invention, the threshold setting circuit comprises first and second resistors and a switch, such as a switching transistor, connected in circuit with the second transistor. The first resistor establishes the threshold for the first autoranging operation and, when required depending on the outcome of the first autoranging operation, the controller sets the switch to couple the second resistor in parallel with the first resistor thereby setting the second threshold for the second autoranging operation to distinguish between near and closeup zones.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
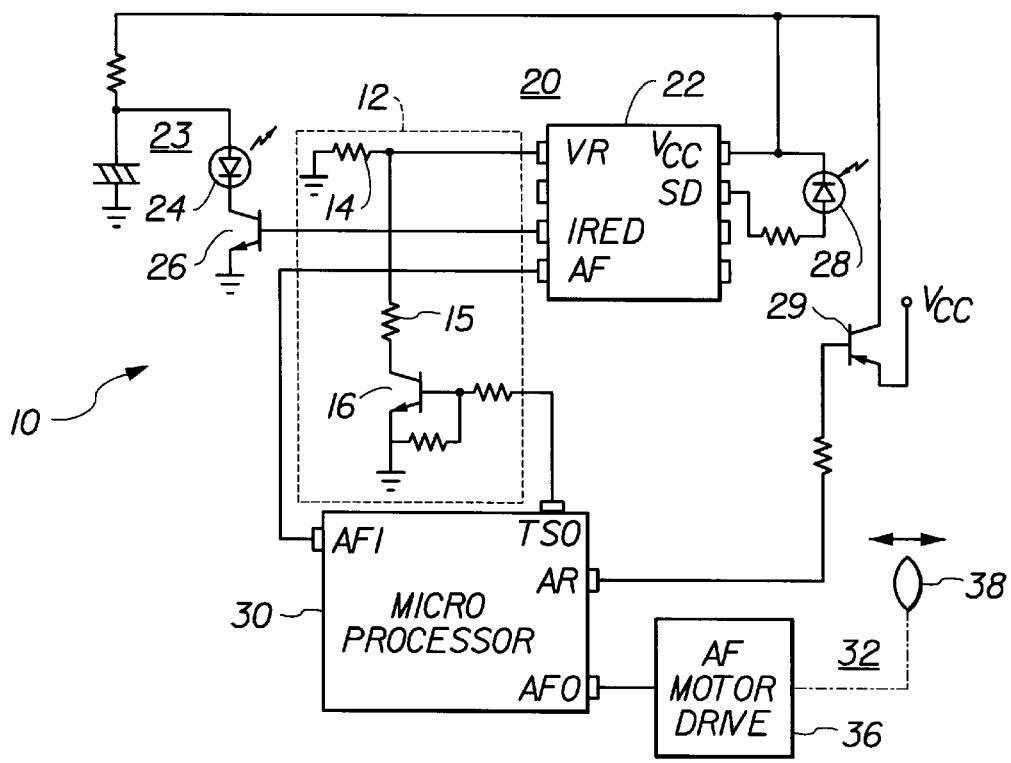
FIG. 1 is a schematic diagram of a multi-zone autofocus system in accordance with a preferred embodiment of the invention.
Figure 2:
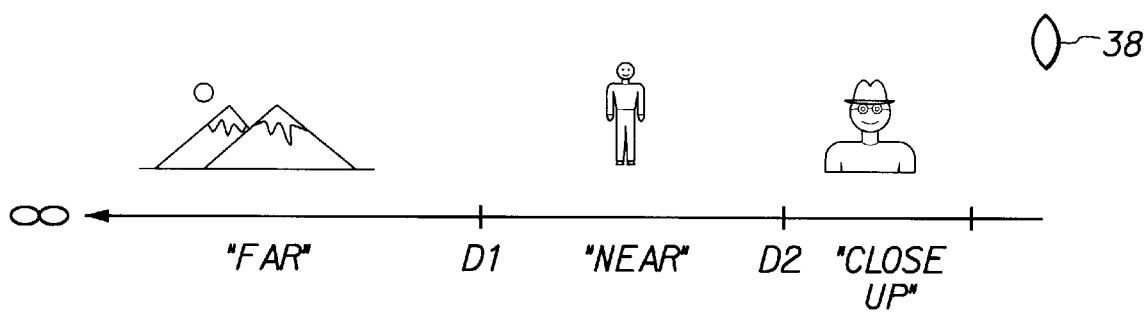
FIG. 2 an illustration of distance zones useful in explaining the invention.

In FIG. 1, there is shown a presently preferred embodiment of a multi-zone autofocus system 10 for a still camera. In the illustrated embodiment, system 10 comprises a distance threshold setting circuit 12, an autoranging circuit 20, a camera controller in the form of a microprocessor 30 and autofocus apparatus 32. The threshold setting circuit 12 comprises resistors 14, 15 and switching transistor 16 and, as will be seen, is sequentially changeable under the control of microprocessor 30 in accordance with an aspect of the invention to set first and second threshold values corresponding to first and second focal distances from the camera. Autoranging circuit 20 includes a conventional two zone autoranging IC chip 22 having a voltage reference pin VR connected to the threshold circuit 12 and which operable in known manner to locate an object in one of two distance zones customarily referred to as "far" and "near" zones separated by a distance amount determined by a value of said threshold setting circuit 12 and to provide a corresponding autofocus control output on output pin AF. A light emitting circuit 23 includes an infra-red emitting diode (IRED) 24 and a switching transistor 26 coupled to output pin IRED of chip 22 as well as a return light sensing photodiode 28 coupled to input pin SD of chip 22. Microprocessor 30 includes an input pin AFI connected to the chip 22 output terminal AF and a pair of output pins TSO and AFO. An output pin AR provides a control signal to activate the autoranging circuit 20 by applying battery voltage $V_{cc}$ to the light emitting circuit 23, light sensor diode 28 and input pin $V_{cc}$ of chip 22. Output terminal TSO is connected to the base of switching transistor 16 in threshold setting circuit 12 to control the ON and OFF setting of transistor 16. Output terminal AFO is connected to autofocus motor drive 36 which, in turn, is mechanically connected to a lens positioning mechanism (not shown) for setting the focus position of lens 38 to one of at least three focus zone settings: "far", "near" and "closeup". These focus zones are shown graphically in FIG. 2 where the "far" zone corresponds to a distance greater than a first distance D1, the "near" zone corresponds to a distance less than D1 but greater than D2, and the "closeup" zone is a distance less than D2.

Figure 3:
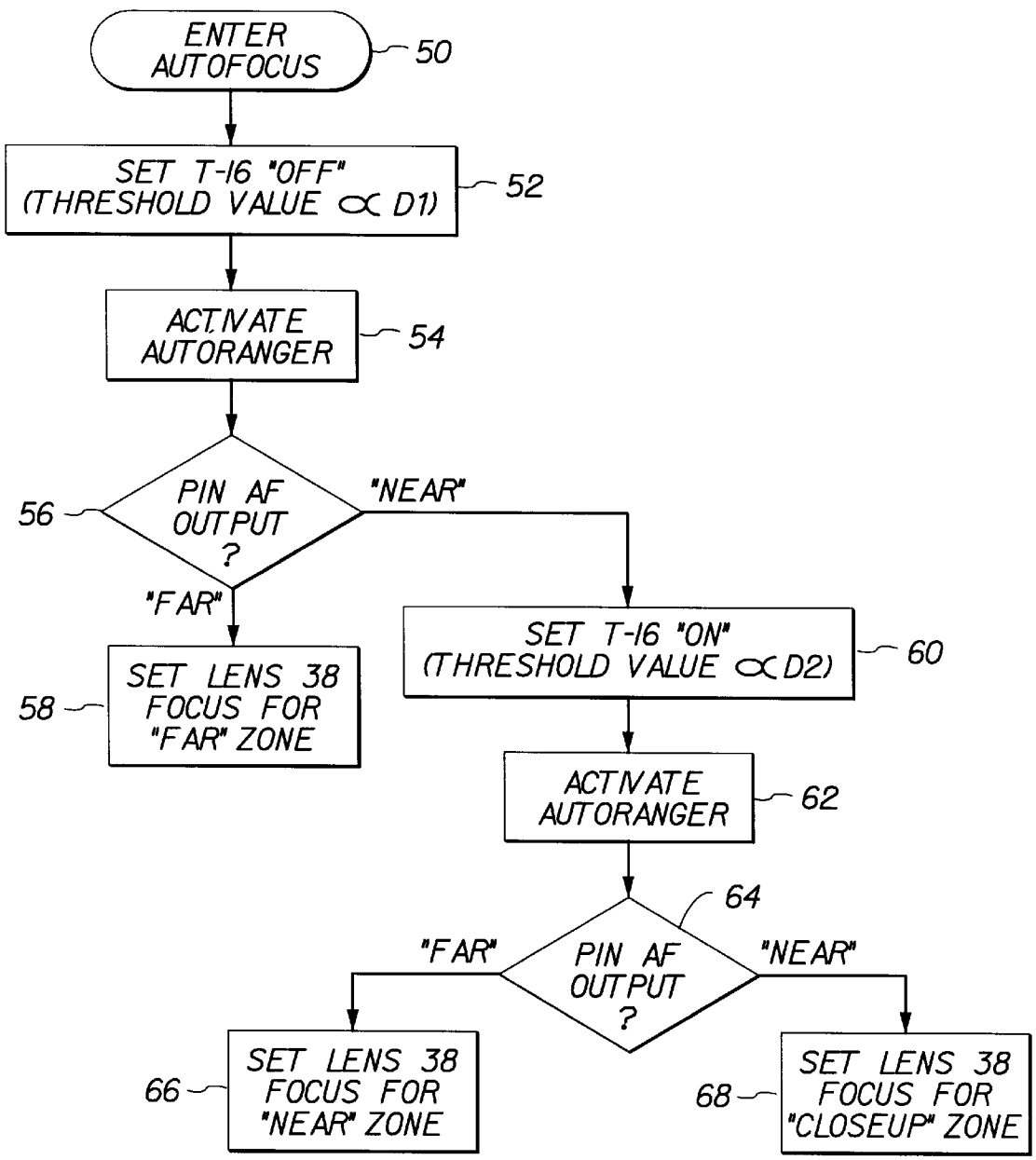
FIG. 3 is a program flow diagram used in explaining the operation of the invention.

Microprocessor 30 serves as a general purpose camera controller and is programmed to control the autoranging circuit 20 and autofocus apparatus 32 to enable the two-zone autoranging circuit 20 to discriminate sequentially between two distance zones with two different threshold settings and to control positioning of the taking lens to a selected focus setting that corresponds to the distance zone of the scene object as indicated by the autoranging device. Referring to FIG. 3, the manner in which microprocessor 30 may be programmed to perform this function will now be described. Upon entering the camera autofocus routine at step 50, the microprocessor 30, at step 52, then issues an output voltage level at terminal TSO that sets transistor 16 at an OFF condition. This effectively removes resistor 15 from the threshold circuit leaving resistor 14 to set the threshold level on chip 22 input pin VR to a value that corresponds to distance D1. At step 54, the microprocessor then outputs a voltage level on pin AR that turns switching transistor 29 on to connect supply voltage $V_{cc}$ to the autoranging circuit 20. This activates the autoranging circuit to perform a first autoranging operation with the distance threshold setting circuit set to the first threshold value corresponding to D1. At step 56, microprocessor 30 checks output pin AF of the autoranger chip 22. If the object is farther than D1, chip 22 returns a "far" indication signal on pin AF and in response thereto, microprocessor 30, at step 58 activates motor drive 36 to set the taking lens 38 to a focus position suitable for the "far" distance zone.

If the chip 22 returns a "near" indication signal indicating the object is closer than D1, microprocessor 30, at step 60, outputs a signal at pin TSO that sets transistor 16 in an "ON" condition to connect resistor 15 in parallel with resistor 14 thereby changing the threshold value at input pin VR of chip 22 to be proportional to distance D2. Microprocessor 30, at step 62, turns transistor 29 on to activate autoranger 20. At step 64, microprocessor 30 again checks output pin if the AF of chip 22. If pin AF returns a "FAR" indication, microprocessor 30 then, at step 66, activates AF motor drive 36 to set lens 38 at a focus position corresponding to the "near" zone between distances D1 and D2. If pin AF returns a "near" indication, microprocessor 30, at step 68, activates AF motor drive to set lens 38 at a focus position corresponding to the "closeup" zone. Thus, in this manner, a low cost three zone autofocus system has been achieved by the sequential autoranging operation with a two-zone ranging device capable of only a "far"/"near" discrimination coupled with adjustable threshold setting under control of microprocessor 30. It will be appreciated that additional zone discrimination can be accomplished using the same two-zone autoranging device by adding additional threshold setting switched resistors in the threshold circuit 12.

The invention has been described in detail with particular reference to certain preferred embodiments thereof, but it will be understood that variations and modifications can be effected within the spirit and scope of the invention.

PARTS LIST 10 multi-zone autofocus system
12 threshold setting circuit
14 resistor
15 resistor
16 switching transistor
20 autoranging circuit
22 IC chip
23 light emitting circuit
24 infra-red emitting diode
26 switching transistor
28 return light sensing photodiode
29 switching transistor
30 microprocessor
32 autofocus apparatus
36 autofocus motor drive
38 lens
50 step
52 step
54 step
56 step
58 step
60 step
62 step
64 step
66 step
68 step

What is claimed is:

1. A multi-zone autofocus system for a still camera comprising:

a distance threshold setting circuit sequentially changeable to set first and second threshold values corresponding to a first distance from the camera and to a second, closer, distance from the camera;

a two zone autoranging circuit connected to said threshold setting circuit and operable to locate an object in one of two distance zones separated by a distance determined by a value of said threshold setting circuit;

autofocus apparatus responsive to said autoranging circuit for setting a camera focus to one of at least two distance zones determined by said autoranging circuit; and a camera controller programmed to activate said autoranging circuit to perform a first autoranging operation with said distance threshold setting circuit set to said first threshold value to determine if said object is located in a zone nearer or farther than said first distance amount and, if farther, to activate said autofocus apparatus to set camera focus for a first distance zone farther than said first distance and, if nearer, to activate said autoranging circuit to perform a second autoranging operation with said distance threshold setting circuit set to said second threshold value to determine if said object is located in a distance zone nearer or farther than said second distance and, if farther, to activate said autofocus apparatus to set camera focus for a second distance zone between said first and second distances and, if nearer, to set said autofocus apparatus for a third distance zone closer than said second distance.

2. The multi-zone autofocus system of claim 1, wherein said camera controller is a microprocessor.

3. The multi-zone autofocus system of claim 1, wherein said distance threshold setting circuit comprises first and second resistors and a switch connected in series with said second resistor.

4. The multi-zone autofocus system of claim 3, wherein said camera controller has a control output connected to said switch and is operative to set said switch to a first condition for said first autoranging operation and to a second condition for said second autoranging operation to change an effective resistance value of said threshold setting circuit and to thereby change said threshold value between said first and second autoranging operations.

5. The multi-zone autofocus system of claim 4, wherein said second resistor is coupled in parallel through said switch with said first resistor when said switch is in an ON condition; said switch being set to an OFF condition for said first autoranging operation and to an ON condition for said second autoranging operation.

6. The multi-zone auto focus system of claim 1 wherein the second distance from the camera is located from 2 to 3 feet from the camera.

7. The multi-zone auto focus system of claim 1 wherein the first distance from the camera is located at least 6 feet from the camera.

* * * * *